United States Patent
Novaes et al.

(10) Patent No.: US 6,769,023 B1
(45) Date of Patent: Jul. 27, 2004

(54) FACILITY FOR MANAGING A SERVICE CONNECTION BETWEEN A CLIENT PROCESS HAVING A SINGLE THREADED LIBRARY AND A SERVER PROCESS

(75) Inventors: Marcos N. Novaes, Hopewell Junction, NY (US); Gregory D. Laib, Kingston, NY (US); Jeffrey S. Lucash, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 09/583,360

(22) Filed: May 31, 2000

(51) Int. Cl.[7] .............................................. G06F 15/173
(52) U.S. Cl. ...................... 709/224; 719/310; 719/316; 370/328; 370/338; 370/349
(58) Field of Search ................................ 709/224, 315, 709/310; 370/328, 338, 349; 714/47, 52; 719/310, 316

(56) References Cited

U.S. PATENT DOCUMENTS

| | | | |
|---|---|---|---|
| 5,249,290 A | | 9/1993 | Heizer ......................... 395/650 |
| 5,553,239 A | | 9/1996 | Heath et al. ............ 395/187.01 |
| 5,758,084 A | | 5/1998 | Silverstein et al. ..... 395/200.58 |
| 5,812,784 A | | 9/1998 | Watson et al. .......... 395/200.57 |
| 5,835,727 A | | 11/1998 | Wong et al. ............ 395/200.68 |
| 5,838,921 A | | 11/1998 | Speeter ................... 395/200.57 |
| 5,905,868 A | | 5/1999 | Baghai et al. ......... 395/200.54 |
| 5,978,577 A | * | 11/1999 | Rierden et al. ................ 707/10 |
| 6,065,138 A | * | 5/2000 | Gould et al. ................... 714/47 |
| 6,148,339 A | * | 11/2000 | Nagamatsu et al. ......... 709/224 |
| 6,212,175 B1 | * | 4/2001 | Harsch ......................... 370/338 |
| 6,336,147 B1 | * | 1/2002 | Brownell et al. ........... 709/310 |
| 6,405,262 B1 | * | 6/2002 | Vogel et al. ................ 709/315 |
| 6,490,610 B1 | * | 12/2002 | Rizvi et al. .................. 709/101 |

FOREIGN PATENT DOCUMENTS

JP          8-263325          10/1996         ........... G06F/11/30

* cited by examiner

Primary Examiner—John Follansbee
Assistant Examiner—Jinsong Hu
(74) Attorney, Agent, or Firm—Lawrence D. Cutter, Esq.; Kevin P. Radigan, Esq.; Heslin Rothenberg Farley & Mesiti P.C.

(57) ABSTRACT

A facility is provided for managing a service connection between a client process having a single threaded library and a server process. The facility includes monitoring activity of a client code of the client process by the client library, and commensurate therewith monitoring activity of the client library across a service connection to the server process, wherein activity of the client library on the service connection is indicative of activity of the client code. The service connection between the client process and the server process is terminated if a message is not received at the server process from the single threaded client library within a defined tolerance interval. Upon termination of the service connection, any locked client resource is recovered at the server process.

28 Claims, 4 Drawing Sheets

FACILITY FOR MANAGING A SERVICE CONNECTION BETWEEN A CLIENT PROCESS HAVING A SINGLE THREADED LIBRARY AND A SERVER PROCESS

CROSS-REFERENCE TO RELATED APPLICATIONS

This application contains subject matter which is related to the subject matter of the following applications, each of which is assigned to the same assignee as this application. Each of the below-listed applications is hereby incorporated herein by reference in its entirety:

"METHOD, SYSTEM AND PROGRAM PRODUCTS FOR MANAGING A CLUSTERED COMPUTING ENVIRONMENT," Novaes et al., Ser. No. 09/583,677, filed May 31, 2000; and "METHOD, SYSTEM AND PROGRAM PRODUCTS FOR AUTOMATICALLY CONNECTING A CLIENT TO A SERVER OF A REPLICATED GROUP OF SERVERS," Uceda-Sosa et al., Ser. No. 09/583,694, filed May 31, 2000.

TECHNICAL FIELD

This invention relates in general to computer networks, and particularly to client/server network architectures wherein a client process has a service connection to a server process. More particularly, the invention relates to a facility for monitoring and managing one or more service connections to a server process.

BACKGROUND OF THE INVENTION

A single threaded library allows for only one thread of execution to utilize the library code. In this class of libraries, a thread is created by the client code which deploys the library, and the library code is then not at liberty to create other threads of execution. This restriction is common in non-thread safe libraries, and a large portion of code libraries in use today are non-thread safe. In a multi-threaded environment, there are often other reasons why libraries may be restricted against starting a new thread of execution.

A negative aspect of single threaded libraries is the difficulty in monitoring the health of client connections to a server from such libraries. It is common for a library to open a connection with a server process. During the course of an active connection with a server, the client library code may acquire resources from the server which are vital to the server process, such as exclusive locks on files and other important resources. It is then desirable for the server to have the ability to detect the situation in which the library is holding these resources for an indefinite amount of time due, for example, to a programming failure in the client code. In the case of single threaded libraries, the library is only able to send messages to the server when it receives control from the client code. If the client code fails to transfer the thread of control to the library code for an indefinite amount of time, the library code will be unable to send messages back to the server.

Thus, the present invention is directed to providing the server process with the capability of detecting a failure at the client code and respond thereto by closing a connection to the client library and recovering the resources to which the library was locking.

DISCLOSURE OF THE INVENTION

Briefly summarized, the present invention comprises in one aspect a method of monitoring a service connection between a client process and a server process. The method includes: monitoring activity of a client code of a client process by a client library of the client process, wherein the client process is a single threaded process; and monitoring activity of the client library across a service connection to a server process, wherein the activity of the client library on the service connection is indicative of activity at the client code.

Systems and program storage devices corresponding to the above-summarized method are also described and claimed herein.

To restate, provided herein is a non-intrusive facility for monitoring and managing service connections between single threaded client libraries and a server process. This non-intrusive facility allows server applications to monitor clients with a minimal amount of network traffic being generated, and can be configured to meaningful values according to a client ping interval (CPI) and a base time-out (BTO) value, which can be obtained as a function of processor speed and system performance.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

MODE FOR CARRYING OUT THE INVENTION

Figure 1:
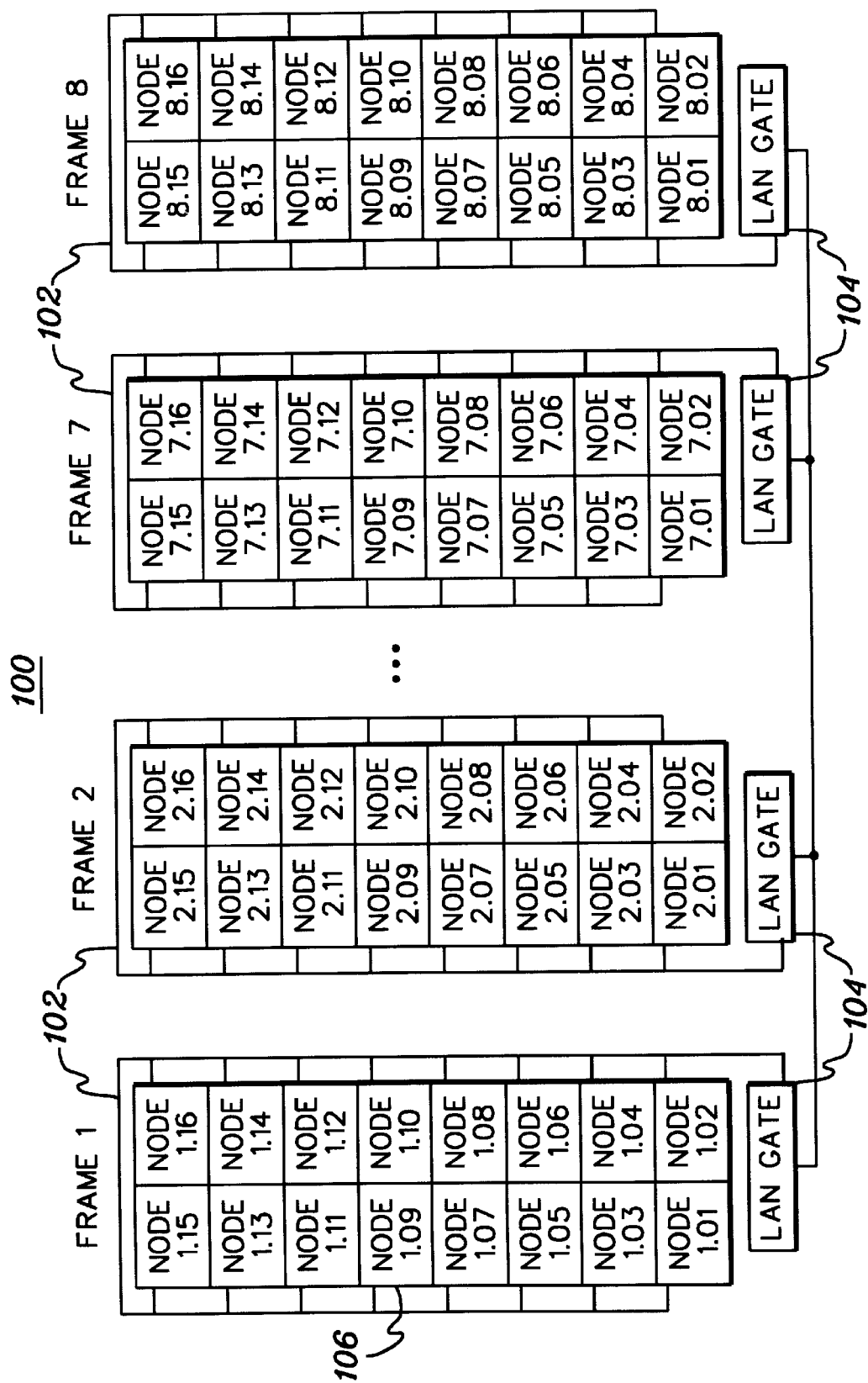
FIG. 1 depicts one example of a computing environment incorporating and using aspects of the present invention.

One example a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via, for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
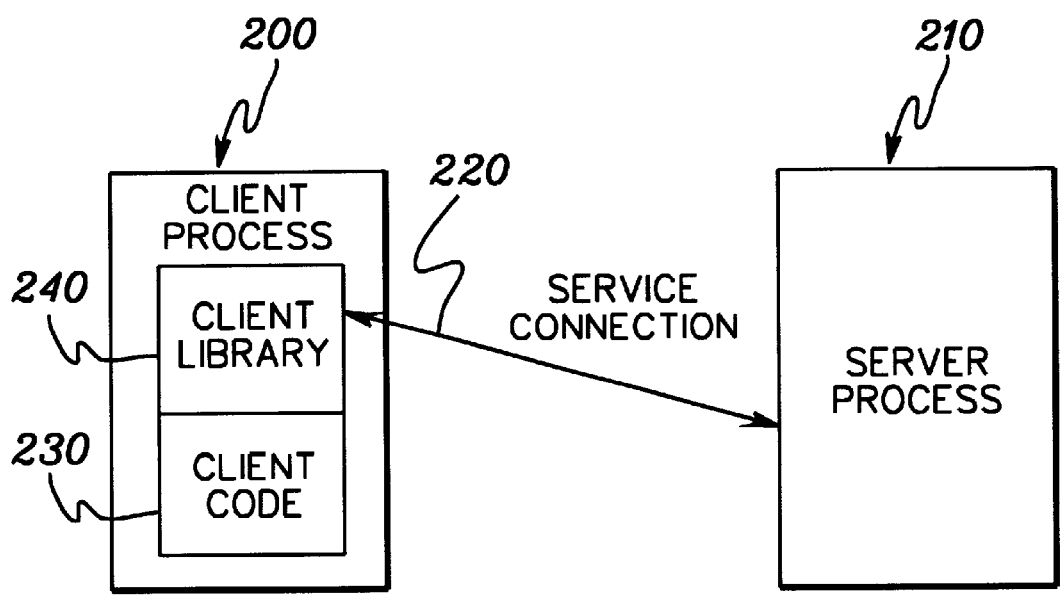
FIG. 2 is a diagram of one embodiment of a client process and server process to employ a facility in accordance with the principles of the present invention.

FIG. 2 depicts a simplified example of a client/server distributed network wherein a client process 200 communicates across a service connection 220 with a server process 210. Client process 200 includes a client code 230 and a client library 240. As noted above, the present invention comprises a non-intrusive facility which monitors the health of a client connection, such as service connection 220, within a single threaded client library (such as library 240) environment. A problem solved by this facility is the case in which a client 200 of server process 210 malfunctions, and holds an active connection to the server application for an indeterminate amount of time. The client may also hold vital resources "locked" in the server application. The server application needs to know if a connection is active or not, i.e., in order that the server can close the connection if the connection is inactive and release the resources associated with it.

As one example, server process 210 may comprise one or more resource managers, which own and control a set of resources within a computing environment. One example of a resource manager is a database management facility, such as DB2, offered by International Business Machines Corporation (Armonk, New York). DB2 is described in "OS/390 Version 5 Release Guide," IBM Publication No. SC26-8965-01 (June 1997), which is hereby incorporated herein by reference in its entirety.

One possible solution to the problem outlined herein would be the use of a verification message sent back to the server process every time the client library gets control of the thread of execution. However, such an approach would generate many verification messages to the server, particularly in the event that the library is frequently used by the client code. For instance, if the library is used at 10 msec intervals, such an approach would use too much of the communications bandwidth with the server.

A preferred facility in accordance with the present invention employs two timers, one at the server and one at the client, which are configured such that a period of non-activity of the client code can be stipulated. This number may be determined empirically for each different application, and is provided as an input parameter for the method described herein. This input parameter is labeled the "base time-out" (BTO) value. In addition, the technique described hereinbelow utilizes a measurement of the network reliability (NR) to determine an interval within which a verification message is to be sent. This interval is labeled the "client ping interval" (CPI) and is determined one embodiment by multiplying the BTO value by the NR value, with the NR value expressed as an average of the percentage with which packages are dropped in the network. Equation (1) expresses this calculation.

$$CPI = BTO \times NR \qquad (1)$$

Using the CPI value and the BTO value, a timer can be defined for use by the server process in order to determine if the client code has become inactive. This timer interval at the server process is labeled the "server ping tolerance" (SPT) and in one embodiment can be expressed as equation (2):

$$SPT = BTO + CPI \qquad (2)$$

Note that the SPT value guarantees that the server will only consider the client code to be inactive if the client fails to exercise the library code within an interval of one BTO unit. The server will perceive this failure within the SPT time interval. Note that these calculations also factor in the reliability of the network (NR). The flowchart embodiments of FIGS. 3 & 4 employ a reading of BTO and NR input values, and the using of them to calculate CPI and SPT as outlined above.

Figure 3:
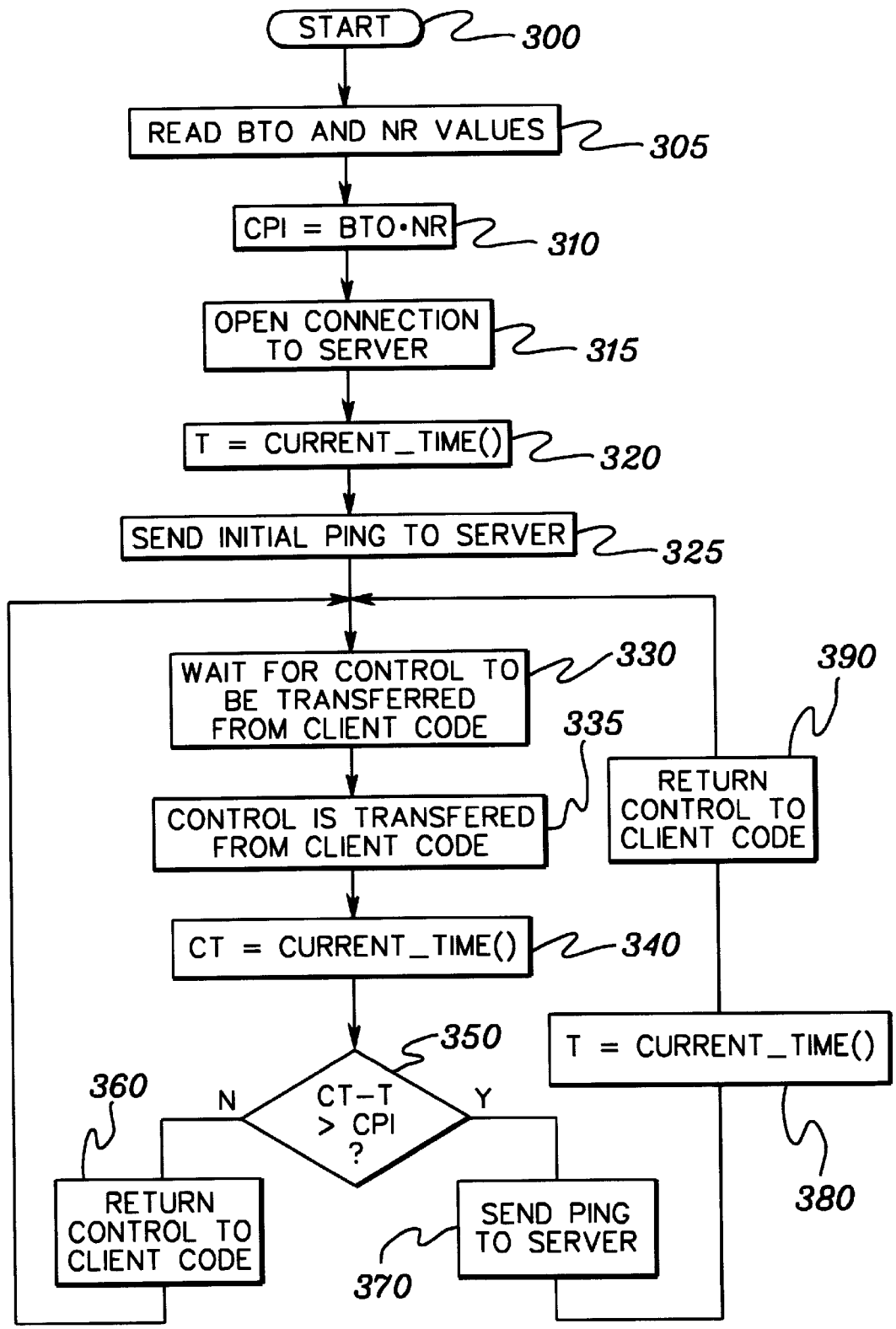
FIG. 3 is a flowchart of one embodiment of client library processing in accordance with the principles of the present invention.

FIG. 3 depicts one embodiment of client library processing in accordance with the present invention. This processing starts 300 with the reading of BTO and NR values 305, which again comprise user inputted values as described above. The BTO value is derived empirically, by, for example, estimating the maximum amount of time that a client be allowed to hold locks on server resources without showing any activity, that is, without transferring control to the client library.

The client library opens a service connection to the server process 315 and a variable T is defined as the current time (current_time ( )) 320. An initial ping is sent from the client library to the server 325. The client library process then enters a loop beginning with waiting for control to be transferred from the client code 330. Once control is transferred from the client code 335, the client library determines current time (CT) at the time of transfer 340. Inquiry is made whether the current time (CT) less the time of the prior ping to the server (T) is greater than CPI 350. Again, CPI (client ping interval) is a maximum interval within which the client library should send a liveness message to the server. The CPI is basically used to control the amount of network traffic generated by the liveness protocol. The quantity is a lower bound, which means that not more than one liveness message (i.e., ping) should be observed within any CPI observation.

Assuming that the difference between current time (CT) and prior time (T) is not greater than CPI, then the client library simply returns control to the client code 360 and waits for control to be subsequently transferred back to the client library from the client code 330 to repeat the process. Once the differential is greater than CPI, then a ping message is sent to the server process 370 and the time of the most recent ping message (T) is reset to current_time ( ) 380. Control is then returned to the client code 390 and the client library waits for control to be transferred back at some time subsequent thereto.

Figure 4:
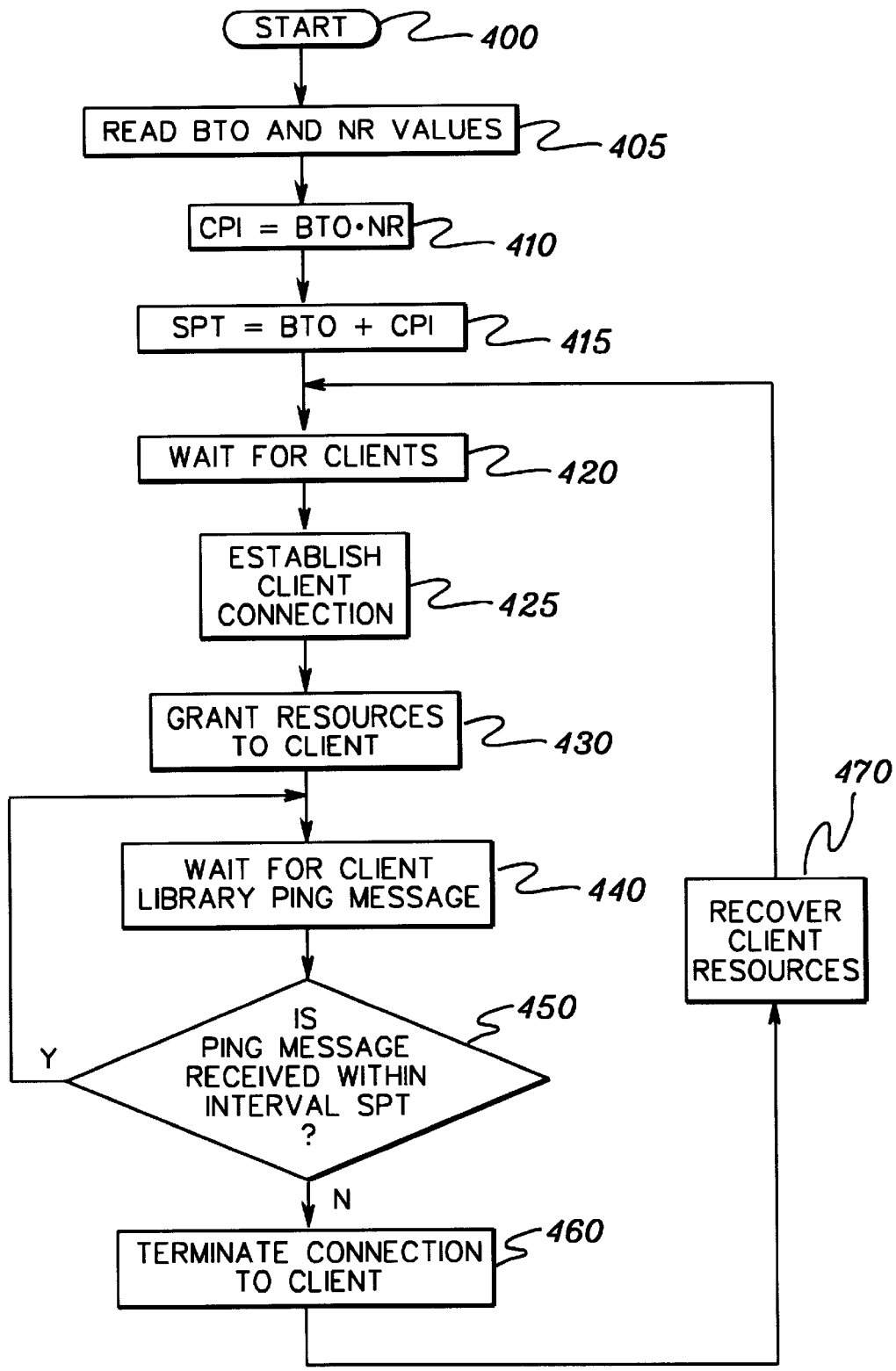
FIG. 4 is a flowchart of one embodiment of server processing in accordance with the principles of the present invention.

FIG. 4 depicts one embodiment of processing implemented at the server process in accordance with the principles of the present invention. This processing starts 400 with a reading of BTO and NR values 405, and calculating of a client ping interval (CPI) 410. The server ping tolerance (SPT) is then determined as BTO+CPI 415. Again, the SPT is the "grace period" which a server will wait to receive a client liveness message (i.e., ping) before it decides that the connection is inactive and should be closed. This is an upper bound used for measuring activity. Basically, the addition of CPI to the BTO value grants an extra degree of tolerance to the SPT value, which can be significant in the extreme scenario where the executing thread simply missed the expiration of the CPI when it was last transferred to the client library.

One way to explain this situation is with an example. Assume that CPI is 10 seconds, and the base time-out value is estimated at 60 seconds. The SPT is then 70 seconds. Now the addition of an extra CPI unit (10 seconds) to the SPT gives an extra degree of tolerance that accommodates the following possible scenario:

(1) Every time that the thread of control is transferred to the client library, the library will check if it should send a liveness message, and preserve the time stamp of the generation of the last message.

(2) Assume that the last time that the thread of execution was transferred to the library was 9 seconds after the last liveness message was issued. Since 9<CPI, the client library does not generate a liveness message at that time, otherwise it would violate the lower bound of the CPI.

(3) Now, the thread of execution is transferred again 55 seconds later, that is 64 seconds after the last message was sent. If the upper bound for the time-out value were the 60 seconds measured empirically, then the client connection would have been considered inactive by the server. Nevertheless, the maximum interval of time that the client library observed without activity was 55 seconds, well within the upper bound.

The conclusion is that since the present invention places the observation of the client activity in the client library, and since the non-intrusive liveness messages are sent by the client library, it is preferred to add at least one unit of tolerance to the upper bound value utilized by the server process to verify the connection activity.

The formula SPT=BTO+CPI conveniently generates a meaningful time-out value that can be used for the server to determine activity in the client connection. Furthermore, the BTO and CPI values are meaningful quantities that can be easily estimated (or configured) which have meaningful implications for the client application; that is, (1) the value is the minimal amount of time allowed between two liveliness messages, and is used to reduce extraneous messages, and (2) the BTO value is the maximum time that a client application is allowed to take without transferring the executing thread back to the client library.

Continuing with FIG. 4, after determining SPT the server process waits for a client process to initiate a connection 420. After establishing a client connection (also referred to here as a server connection) 425, the server process may grant one or more of its resources to the client process 430. The server process then waits for the client library ping message 440 indicative of continued client code activity as described above. The server process determines whether the ping message is received within the interval SPT 450, and if so, waits for the next ping message 440. If the service connection is inactive for an interval greater than SPT, then the server process terminates the connection to the client process 460 and recovers the client resources 470 before returning to await a next client connection 420.

Those skilled in the art will note from the above description that the time quantities utilized by the processes of the present invention can be obtained from the same clock at the client system, which is a virtue of the process described since it does not require synchronization of a client clock with a server clock. The facility outlined herein allows server applications to monitor clients with minimal network traffic, and can be configured to meaningful values according to the CPI and BTO estimates, which can be obtained as a function of processor speed and performance. Furthermore, the technique presented herein is non-intrusive and can be used by single threaded client applications.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and as fall within the true spirit and scope of the invention.

What is claimed is:

1. A method for monitoring a service connection between a client process and a server process, said method comprising:

monitoring activity of a client code of a client process by a client library of said client process, wherein said client process is a single threaded process, and wherein the client process comprises both said client code and said client library; and monitoring activity of said client library across a service connection to a server process, said activity of said client library on said service connection being indicative of activity at the client code.

2. The method of claim 1, wherein said monitoring activity of the client code by the client library further comprises periodically sending a ping message to the server process across the service connection indicative of monitored activity at the client code.

3. The method of claim 2, wherein said monitoring activity of the client library by the server process comprises determining whether a ping message is received across the service connection within a service ping tolerance interval.

4. The method of claim 3, further comprising terminating said service connection between the client process and server process if a ping message is not received at the server process from the client library within the server ping tolerance interval.

5. The method of claim 4, further comprising recovering client resources at the server process subsequent to termination of said service connection.

6. The method of claim 1, wherein said monitoring activity of the client code by the client library further comprises determining a client ping interval (CPI) as a base time-out value (BTO) multiplied by a network reliability (NR) value, and employing said CPI to periodically send a ping message to the server process across the service connection indicative of monitored activity at the client code when a time interval since a last ping message to the server process exceeds said CPI.

7. The method of claim 6, wherein said monitoring activity of the client library by the server process comprises determining whether a ping message is received across the service connection within a service ping tolerance (SPT) interval, wherein SPT is defined as BTO+CPI.

8. The method of claim 6, wherein said monitoring activity of the client code by the client library comprises determining a current time (CT) when control is transferred from the client code to the client library and determining said time interval since a last ping message was sent to the server process as CT less a time (T) that the last ping message was sent to the server process, and said employing comprises determining whether CT−T>CPI.

9. The method of claim 8, wherein said monitoring activity of the client code by the client library further comprises setting time T equal to a current time when the ping message is sent to the server process across the service connection, and returning control thereafter to the client code.

10. A system for monitoring a service connection between a client process and a server process, said system comprising:
   means for monitoring activity of a client code of a client process by a client library of the client process, wherein the client process is a single threaded process, and wherein the client process comprises both said client code and said client library; and
   means for monitoring activity of the client library across a service connection to a server process, said activity of the client library on the service connection being indicative of activity at the client code.

11. The system of claim 10, wherein said means for monitoring activity of the client code by the client library further comprises means for periodically sending a ping message to the server process across the service connection indicative of monitored activity at the client code.

12. The system of claim 11, wherein said means for monitoring activity of the client library by the server process comprises means for determining whether a ping message is received across the service connection within a service ping tolerance interval.

13. The system of claim 12, further comprising means for terminating said service connection between the client process and server process if a ping message is not received at the server process from the client library within the server ping tolerance interval.

14. The system of claim 13, further comprising means for recovering client resources at the server process subsequent to termination of said service connection.

15. The system of claim 10, wherein said means for monitoring activity of the client code by the client library further comprises means for determining a client ping interval (CPI) as a base time-out value (BTO) multiplied by a network reliability (NR) value, and means for employing said CPI to periodically send a ping message to the server process across the service connection indicative of monitored activity at the client code when a time interval since a last ping message to the server process exceeds said CPI.

16. The system of claim 15, wherein said means for monitoring activity of the client library by the server process comprises means for determining whether a ping message is received across the service connection within a service ping tolerance (SPT) interval, wherein SPT is defined as BTO+CPI.

17. The system of claim 15, wherein said means for monitoring activity of the client code by the client library comprises means for determining a current time (CT) when control is transferred from the client code to the client library and means for determining said time interval since a last ping message was sent to the server process as CT less a time (T) that the last ping message was sent to the server process, and said means for employing comprises means for determining whether CT−T>CPI.

18. The system of claim 17, wherein said means for monitoring activity of the client code by the client library further comprises means for setting time T equal to a current time when the ping message is sent to the server process across the service connection, and for returning control thereafter to the client code.

19. A system for monitoring a service connection comprising:
   a single threaded client process comprising a client code and a client library, wherein the client library is adapted to monitor activity of the client code, and wherein the client process comprises both said client code and said client library; and
   a server process coupled to the client process by a service connection, said server process being adapted to monitor activity of the client library across the service connection, wherein activity of the client library on the service connection is indicative of activity at the client code.

20. At least one program storage device readable by a machine tangibly embodying at least one program of instructions executable by the machine to perform a method of monitoring a service connection between a client process and a server process, said method comprising:
   monitoring activity of a client code of a client process by a client library of said client process, wherein said client process is a single threaded process, and wherein the client process comprises both said client code and said client library; and
   monitoring activity of said client library across a service connection to a server process, said activity of said client library on said service connection being indicative of activity at the client code.

21. The at least one program storage device of claim 20, wherein said monitoring activity of the client code by the client library further comprises periodically sending a ping message to the server process across the service connection indicative of monitored activity at the client code.

22. The at least one program storage device of claim 21, wherein said monitoring activity of the client library by the server process comprises determining whether a ping message is received across the service connection within a service ping tolerance interval.

23. The at least one program storage device of claim 22, further comprising terminating said service connection between the client process and server process if a ping message is not received at the server process from the client library within the server ping tolerance interval.

24. The at least one program storage device of claim 23, further comprising recovering client resources at the server process subsequent to termination of said service connection.

25. The at least one program storage device of claim 20, wherein said monitoring activity of the client code by the client library further comprises determining a client ping interval (CPI) as a base time-out value (BTO) multiplied by a network reliability (NR) value, and employing said CPI to periodically send a ping message to the server process across the service connection indicative of monitored activity at the client code when a time interval since a last ping message to the server process exceeds said CPI.

26. The at least one program storage device of claim 25, wherein said monitoring activity of the client library by the server process comprises determining whether a ping message is received across the service connection within a service ping tolerance (SPT) interval, wherein SPT is defined as BTO+CPI.

27. The at least one program storage device of claim 25, wherein said monitoring activity of the client code by the client library comprises determining a current time (CT) when control is transferred from the client code to the client library and determining said time interval since a last ping message was sent to the server process as CT less a time (T) that the last ping message was sent to the server process, and said employing comprises determining whether CT−T>CPI.

28. The at least one program storage device of claim 27, wherein said monitoring activity of the client code by the client library further comprises setting time T equal to a current time when the ping message is sent to the server process across the service connection, and returning control thereafter to the client code.

* * * * *